Feb. 21, 1933.  E. N. SNODGRASS  1,898,148
ICE CREAM CONFECTION
Filed Jan. 22, 1932

Inventor
Edward Norman Snodgrass.
By A. J. O'Brien
Attorney

Patented Feb. 21, 1933

1,898,148

UNITED STATES PATENT OFFICE

EDWARD NORMAN SNODGRASS, OF DENVER, COLORADO, ASSIGNOR TO NORMAN CONFECTIONS INC., OF DENVER, COLORADO, A CORPORATION OF COLORADO

ICE CREAM CONFECTION

Application filed January 22, 1932. Serial No. 588,132.

This invention relates to improvements in frozen confections and has reference more particularly to an improved ice cream confection of the sundae type.

Ice cream sundaes are very popular and, as now dispensed, consist of ice cream over which is poured a flavoring syrup such as a chocolate syrup, or the like. Owing to the way in which this confection is prepared and served its sale is limited almost exclusively to soda fountains or restaurants and hotels having the proper facilities for preparing and dispensing this kind of ice cream confection.

It is the object of this invention to produce an ice cream sundae of such a nature that it can be sold in packages of suitable size and which can be readily transported and eaten or served at any place without resort to spoons, dishes or other utensils and which, therefore makes it practical to serve ice cream sundaes at home and at parties in private homes, churches, etc.

It has been explained above that the ordinary ice cream sundae has the syrup poured over it and can therefore not be handled after it has been prepared, but must be served and eaten at the place where it is prepared.

It is the object of this invention to produce an ice cream sundae in which the syrup or other tasty dressing instead of being poured over the outside of the ice cream is placed in an opening in the ice cream and confined or if desired can be sealed against accidental removal. The ice cream is preferably first moulded into the desired shape after which it is cored and the syrup introduced into the opening for confinement on all sides except the initial region of entrance, and thereupon the open end thereof may be sealed so that the syrup will not escape under any circumstances.

The syrup used for sundaes has a much lower freezing point or freezing coefficient than ice cream and will not solidify except at such low temperature that the ice cream would be too hard to serve and therefore it is always in flowable condition when the ice cream is of suitable consistency for serving and eating. Since the syrup is in unfrozen or flowable condition at the ordinary temperatures at which ice cream is served and eaten, it may be desirable that the opening in which it is placed must be sealed in order that the syrup will not flow out during handling should such be shipped without extra-hardening of the ice cream with consequent freezing of the viscous filler. It is obvious, though, that the ice cream block with its viscous filler may be subjected to hardening temperatures so that the filler will temporarily solidify and then re-liquefy while in merchant's refrigerator or upon reaching its destination. In that event as well as with special handling racks, the filler charged cavity may not necessarily be covered or closed with ice cream or other closures.

I am aware that ice cream has been formed into blocks and cored and the opening filled with ice cream of different flavor or color, but in these cases the core is of the same material and the same consistency as the outside at all temperatures and consequently do not have to be sealed in the block which is essential where the core is formed from a syrup that is flowable and which would run out unless completely confined.

In order to more clearly describe the invention, it has been illustrated on the accompanying drawing in which.

Figure 1:
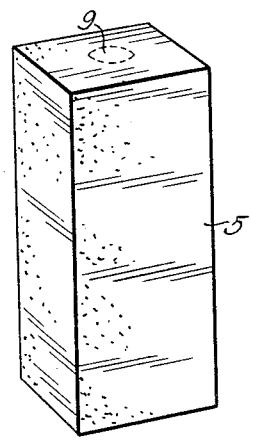
Fig. 1 is a perspective view showing an ice cream confection embodying this invention.
Figure 2:
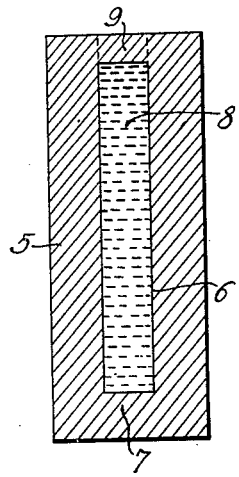
Fig. 2 is a longitudinal section of the confection shown in Fig. 1, the interior being shown as filled with a flavoring syrup.
Figure 3:
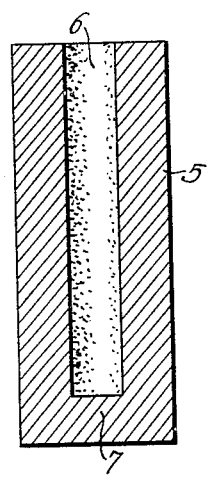
Fig. 3 is a longitudinal section showing the ice cream body before the syrup has been introduced into it.

This confection consists of a body of ice cream 5 which is preferably though not essentially moulded or cut into parallelopipedal form. After the body has been properly shaped, a central core is removed so as to leave an opening or cavity 6 as shown in Fig. 3. The opening or cavity does not extend entirely through but terminates short of the bottom so as to leave a wall 7 between the lower end of the opening or cavity 6 and the corresponding end of the ice cream body, thereby closing the cavity 6 on all sides except the initial piercing region. After the opening has been formed, the interior is filled with an edible liquid filler such as a flavoring syrup 8 customarily used in preparing the ordinary ice cream sundaes. The syrup preferably though not essentially fills the opening or cavity 6 except for a short space which may be left at the top and this space is then occupied by a mass of material corresponding to the body 5 and frozen in the core 6 to define a homogeneous plug cohesive therewith to serve as a closure 9. After the syrup has been confined in the cavity 6, the assembly has the appearance shown in Fig. 1 and a cross section like that shown in Fig. 2 with the core 6 and its filler 8 enclosed on all sides by the form-retaining and form maintaining body 5 and end closures 7 and 9 homogeneously therewith. When both ends of the opening or cavity 6 are closed, the outside appearance of the confection is the same as if it were formed completely of ice cream. The syrup used for filling the core being an almost and sometimes a completely saturated sugar solution, has a very low freezing point, with the result that at the ordinary temperatures at which the ice cream is kept, and at which it is dispensed and eaten, the core is in flowable condition, so that if the cavity 6 is not completely enclosed while subjected to ordinary freezing temperatures, the syrup would flow out when tilted and make it impractical to commercially distribute an ice cream confection of this type unless refrigerated at lower temperatures. For the reason just stated it is desirable that the syrup shall be entirely enclosed within the body of the ice cream.

I am aware that ice cream has been cored and the openings thus formed filled with ice cream of a different color or of a different flavor, but since the material introduced into the core openings is substantially the same as that of the body, the body and the core have the same reaction towards temperature and when one is solid the other will be, which makes it unnecessary to entirely enclose the core and differs from the present invention in this respect.

Figure 4:
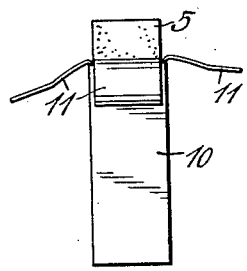
Fig. 4 is a view showing the confection in place in a special carton designed for dispensing the same.

In Fig. 4 I have shown the confection in place in a carton 10 which is constructed in accordance with the specification and drawing forming part of my copending application Serial No. 587,953, filed January 21, 1932. These cartons have a slidable inner lining that is composed of four separate parts 11 that can be peeled away from the confection so as to expose the end thereof, and serve as holders for convenience in eating the contents.

From the above description it will be seen that I have produced an ice cream confection corresponding to the ordinary sundae, but in which the syrup is contained within the body of the ice cream and this makes it suitable for use at private houses and other places where facilities are not present for preparing the ordinary sundaes with the flavoring syrup on the outside. Since the sundae syrup is located wholly within the body 5 and the end closures 7 and 9 formed in continuity and homogeneously therewith of the ice cream, there cannot be accidental leakage and the confection can therefore be handled exactly as if it were an ordinary piece of ice cream for consumption without resort to spoons, dishes or other implements.

Particular attention is called to the fact that the core should be in flowable condition at the ordinary temperatures at which the ice cream is dispensed and eaten, because if the temperature were so low that the cores were frozen solid, or, if the cores were of such compositon that they would remain solid at the ordinary temperatures at which the ice cream is eaten, the core would be highly objectionable for the reason that it could not be bitten and would be apt to injure the teeth an account of its hardness, and also because if the core were solid the proper amount of flavoring syrup would not be mixed with the ice cream.

Having described the invention what is claimed as new is:

1. A self-contained confection comprising an edible casing formed from a normally liquid material frozen to a substantially solid state, there being a cavity in said solid casing originally closed on all sides except one, a viscous liquid filler confined in said cavity, and an edible closure of similar normally liquid material frozen to a substantially solid state in said cavity for cohesion with the interior wall thereof to constitute a homogeneous part of said casing, said casing and closure being form-retaining and form-maintaining to totally confine the liquid filler therein and enable consumption of said self-contained confection from the fingers.

2. A self-contained edible product comprising an ice cream casing of rectangular configuration formed from a normally liquid material frozen to a substantially solid state, there being a preformed cavity in said casing, a flavored viscous syrup confined in said cavity, said syrup filler having a freezing point substantially lower than the surrounding ice cream casing so that the former will retain its liquidity under normal temperature conditions of ice cream production and storage, and an edible closure of similar normally liquid material frozen to a substantially solid state in said cavity above the filler therein for cohesion with the exposed cavity wall surface to constitute a part of said casing, said casing and closure being form retaining and form maintaining to totally confine the liquid filler against leakage and retain the composite relation of the constituents under ordinary conditions of ice cream storage.

In testimony whereof I affix my signature.

EDWARD NORMAN SNODGRASS.